Figures 1, 2:
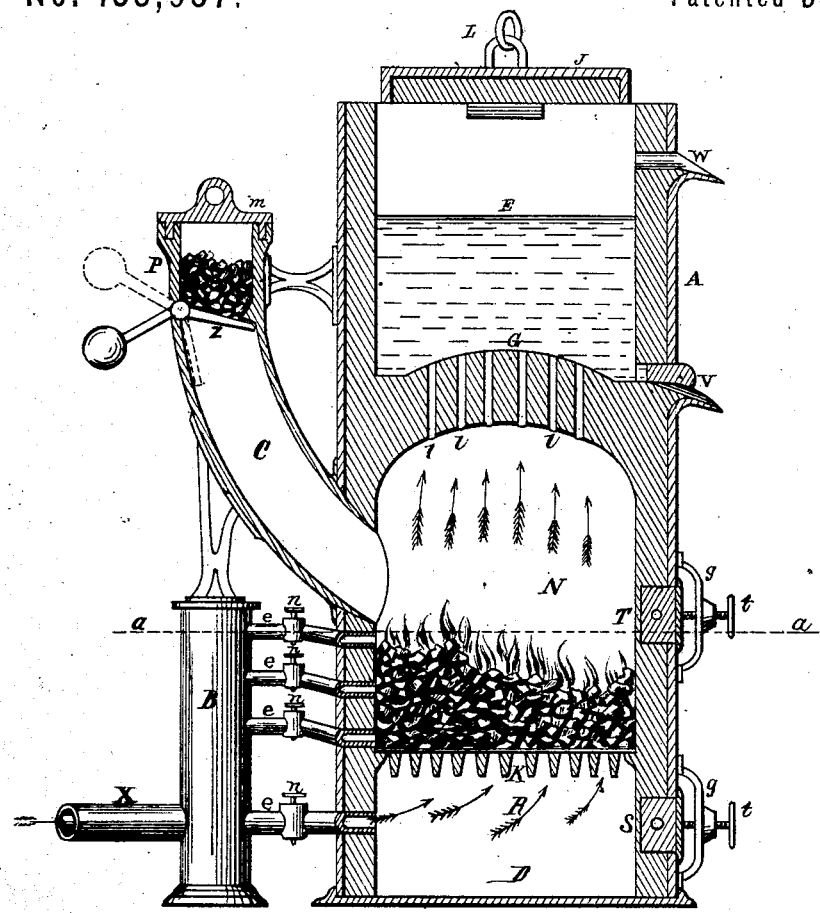

N. B. HATCH.
Refining Iron and Steel.

No. 133,937. Patented Dec. 17, 1872.

Attest
Francis Torrance
Cornelious Callio

Inventor.
N. B. Hatch
By his Attorney
Josiah W. Ely

UNITED STATES PATENT OFFICE.

NATHANIEL B. HATCH, OF PITTSBURG, PENNSYLVANIA, ASSIGNOR TO HIMSELF AND PITTSBURG BOLT COMPANY, OF SAME PLACE.

IMPROVEMENT IN REFINING IRON AND STEEL.

Specification forming part of Letters Patent No. 133,937, dated December 17, 1872.

*To all whom it may concern:*

Be it known that I, NATHANIEL BLANCHARD HATCH, of Pittsburg, in the county of Allegheny and State of Pennsylvania, have invented a new and Improved Mode of Refining Metals, of which the following is a specification:

My improvement relates to the agitation and purification of molten iron or other metals inclosed within a stationary retort or crucible, or on a furnace-hearth, by forcing through such molten metal streams of intensely-heated deoxygenated or carbonized atmospheric air, obtained by previously passing atmospheric air through a body of fire or carbon in a highly heated or incandescent state; and in order to accomplish this I arrange, immediately under or in close proximity to the hearth, crucible, or retort a close chamber, in which I burn the carbureting material, and into which, at different points, above, below, or adjacent to the carbureting material, a series of air-pipes provides the means of supplying air in the desired quantities and at the desired points. This chamber constitutes a holder as well as a heater, so as to keep the gas at a high temperature till it is introduced directly into the molten metal. My improvement consists in the features of construction and combination hereinafter set forth and claimed.

The means by which I put my invention into practice will be readily understood by the following description, taken in connection with the accompanying drawing, wherein—

Figure 1 represents a transverse vertical section of the refining apparatus; Fig. 2, a transverse section on the dotted lines *a a*.

To carry my invention into operation, I take a strong cylindrical metallic casing, A, and secure it in a perpendicular position on a circular iron bed-plate, D. This casing is provided with an opening, *s*, therein, near its bottom, leading into that part intended for the ash-pit R, and a similar opening, T, on a vertical line a short distance above, so as to open into the fire-box N. Each of these openings are to be closed by a tightly-fitting door, *o*, held in place by a yoke, *g*, and screw *t*, or any other mechanical contrivance that will answer the end. On the opposite side of this cylinder A is erected an air-receiver, B, which, by means of a large supply-pipe, X, is placed in communication with a powerful blast-engine; and by a series of smaller branch pipes, *e e e e*, in connection with the interior of the cylinder A, the lowermost branch pipe leading directly into the ash-pit R, and the others above the grate K, at different heights, into the fire-box N. Each of these branch pipes is provided with a valve or cock, *n*, for regulating the admission of air either above, below, or through the fire. Above the grate and opening into the fire-box is arranged an inclined chute, C, furnished at its top with a hopper, P, having a tightly-fitting lid, *m*, and tilting bottom *z*, so that carbonaceous fuel may be fed as desired into the fire-box N in such a manner as to prevent the escape of either air or gas in that direction. The cylinder A is to be lined with clay or fire-brick, and a dome-shaped arch, G, constructed of similar refractory material, above the fire-box N, which arch has several small vertical openings *l l l*, made through it. Just at the spring of the arch is a tap-hole, V, similar to those used in ordinary melting-furnaces; and near the top of the cylinder is a small outlet or waste hole, W. The cylinder A is also provided with a loosely-fitting cap, J, lined with fire-clay, and arranged so as to be raised or lowered in the cylinder A by means of a chain, L, attached thereto.

Operation.

The several parts of this apparatus being constructed as shown and set forth, a fire is to be kindled on the grate K and the doors *o o* closed perfectly tight, when a blast of air is to be turned into the ash-pit under the fire by opening the valve in the lowermost branch pipe *e*. The lid J is then placed on the mouth of the cylinder A in the manner represented in Fig. 1, and the fire increased by adding fuel through the chute C until the entire interior of the apparatus is brought to a high heat. The lid J is then to be raised and the upper portion of the cylinder above the arch G, constituting the retort or crucible E, teemed nearly full of molten metal. The blast, being increased in proportion to the quantity of metal poured in, rushes with great force through the fire, and the several small openings, *l l l*, in the arch G, (prevents the molten metal from falling,)

and drives through the liquid mass, producing therein a violent ebullition, raising the impurities and foreign matter, as gas and scoria, to the surface, the gaseous matter escaping directly into the atmosphere, and the scoria removed by skimming, or allowed to flow off through the outlet W. As the refining process is carried on the quality and condition of the metal may be regulated by attention to the several branch pipes *e e e e* and their respective valves *n*. For instance, if it is desirable that the natural carbon in the metal should be retained, then the blast of atmospheric air must of necessity have its oxygen satisfied and surcharged with carbon previous to its entering the molten metal; otherwise such oxygen would search out the native carbon and utterly destroy it. To deoxygenate such air as may constitute the blast, it is caused to pass through a body of fire, by which the affinity of its oxygen for highly-heated carbon is supplied or neutralized, and thereby converted into a carbonic-oxide gas, which, being indifferent to the carbon in the metal as it passes through, attacks only the phosphorus, sulphur, silicium, and other impurities, which are volatilized and pass off as gas, or are driven to the surface in the condition of scoria, that may be allowed to flow off or be removed by mechadical means, leaving the metal in a highly-carbureted state. Should it be found requisite to discharge the whole or a portion of this carbon, the same may be accomplished by causing the blast to pass partially or entirely above the fire, by which it will enter the metal in varying conditions, or may be sent in as simple heated atmospheric air, carrying with it its oxygen, which, uniting with the carbon in the metal, consumes it, speedily bringing the metal to a decarbonized and partially-oxidized condition. To reinstate, or rather replace, by other carbon the carbon so consumed, the blast is thrown once more under and through the body of fire, where its oxygen, taking up its equivalent of carbon, is converted into a carbonic-oxide gas, as hereinbefore stated, which, in passing upward through the molten metal, gives up a portion of its carbon to the metallic oxides until they are completely saturated or satisfied, bringing the metal once more to a carbonized condition, and, if iron, giving it the quality of steel. As the metal becomes refined its density and gravity are increased, the heavier portion sinking to the bottom of the crucible, where it may be drawn off from time to time through the tap-hole V and run into ingot-molds, or otherwise, as the exigency of the case may require.

Claims.

I claim—

1. A close chamber, N, for treating air, preparatory to utilizing the same in the purification of molten metals, such chamber being supplied with carbureting material, and having leading into it a series of air-pipes at different points relative to the carbureting material, whereby the air may be prepared for admission to the molten metal more or less completely deoxygenated and carbureted, at pleasure, substantially as set forth.

2. The carbureting-chamber and series of air-pipes of the last claim, arranged in combination with a furnace-hearth, retort, or crucible so as to discharge into the molten metal the air or gas at the same temperature and in the same condition in which it leaves the deoxygenating and carbureting material, substantially as set forth.

N. B. HATCH.

Witnesses:
FRANCIS TORRENCE,
CORNELIOUS CALLIO.